US011971141B2

(12) United States Patent
Gumann et al.

(10) Patent No.: US 11,971,141 B2
(45) Date of Patent: Apr. 30, 2024

(54) LOW THERMAL CONDUCTIVITY SUPPORT SYSTEM FOR CRYOGENIC ENVIRONMENTS

(71) Applicant: International Business Machines Corporation, Armonk, NY (US)

(72) Inventors: Patryk Gumann, Tarrytown, NY (US); Valerio A. Grendanin, St. Augustine, FL (US); Jerry M. Chow, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 17/144,894

(22) Filed: Jan. 8, 2021

(65) Prior Publication Data

US 2022/0221106 A1 Jul. 14, 2022

(51) Int. Cl.
*F17C 3/08* (2006.01)
*F25D 19/00* (2006.01)

(52) U.S. Cl.
CPC ............ *F17C 3/085* (2013.01); *F25D 19/006* (2013.01); *F17C 2203/0391* (2013.01)

(58) Field of Classification Search
CPC . F25D 19/006; F17C 3/085; F17C 2203/0391
USPC .................................................. 62/45.1, 51.1
See application file for complete search history.

(56) References Cited

U.S. PATENT DOCUMENTS

| | | | | |
|---|---|---|---|---|
| 4,918,927 | A * | 4/1990 | Eigenbrod | F17C 9/00 220/560.12 |
| 5,385,026 | A * | 1/1995 | Zhang | F17C 13/083 62/50.7 |
| 2016/0078987 | A1 * | 3/2016 | Simpkins | H01F 6/04 62/51.1 |
| 2017/0168121 | A1 * | 6/2017 | Yu | A61B 5/05 |
| 2020/0363014 | A1 | 11/2020 | Hart et al. | |

FOREIGN PATENT DOCUMENTS

| | | |
|---|---|---|
| GB | 2493553 A | 2/2013 |

OTHER PUBLICATIONS

International Search Report and Written Opinion received for PCT Application Serial No. PCT/EP2021/087872 dated Apr. 25, 2022, 13 pages.

Van Rhenen et al., "4K : Dilution Refrigerator Overview", Retrieved from the Internet: URL: https://www.youtube.com/watch?v=J6H3GxzSDj8, XP055910717, Jan. 27, 2020.

Courtland R., "Getting on Dark Matter's Wavelength", IEEE Spectrum, vol. 51, No. 5, May 1, 2014, pp. 38-45.

(Continued)

*Primary Examiner* — Joseph F Trpisovsky
(74) *Attorney, Agent, or Firm* — Amin, Turocy & Watson, LLP

(57) ABSTRACT

Techniques facilitating low thermal conductivity support systems within cryogenic environments are provided. In one example, a cryostat can comprise a support rod and a washer. The support rod can couple first and second thermal stages of the cryostat. The washer can intervene between the support rod and the first thermal stage. The washer can thermally isolate the support rod and the first thermal stage.

26 Claims, 8 Drawing Sheets

(56) References Cited

OTHER PUBLICATIONS

Anonymous, “Visit to Oxford Instruments—Jul. 13, 2017”, Retrieved from the Internet: URL:https://www.cantab.net/users/raul/read%20more/oxford.html, Jul. 13, 2017, 2 pages.
Oxford Instruments, “Oxford Instruments NanoScience Proteox Webinar”, Retrieved from the Internet: URL: https://www.youtube.com/watch?v=_iO7weK1UU4&t=1161s, (moved to URL :https://www.youtube.com/watch?v=_iO7weKIUU4) XP055910477, May 21, 2020.
Bluefors, “Cool Technology Enables Quantum Computing—by Bluefors”, Retrieved from the Internet: URL:https://www.youtube.com/watch?v=6Dx8TusDMB8, XP055910703, Jun. 5, 2020.
Anonymous, “Physikalisches Institut—Our Profile—Jobs—Setting Up a Dilution Refrigerator”, Retrieved from the Internet: URL: https://www.phi.kit.edu/english/jobs_1452.php, XP055910745, Feb. 20, 2017, 4 pages.
“Erik Van Rhenen: ”“4K Dilution Refrigerator overview”“, Jan. 27, 2020 (Jan. 27, 2020), XP055910711, Retrieved from the Internet: URL:https://www.youtube.com/watch?v=4owqe-nBiic ”.
Reply dated Feb. 15, 2024 to EP Office Action under Rules 161(1) and 162 EPC dated Aug. 16, 2023 for EP Application No. EP21844795.1.

* cited by examiner

LOW THERMAL CONDUCTIVITY SUPPORT SYSTEM FOR CRYOGENIC ENVIRONMENTS

BACKGROUND

The subject disclosure relates to cryogenic environments, and more specifically, to techniques of facilitating low thermal conductivity support systems within cryogenic environments.

A cryostat can maintain samples or devices positioned on a sample mounting surface located within the cryostat at temperatures approaching absolute zero to facilitate evaluating such samples or devices under cryogenic conditions. Cryostats generally provide such low temperatures utilizing five thermal stages that are mechanically coupled to a room temperature plate of an outer vacuum chamber that encloses the five thermal stages. The five thermal stages of a cryostat comprise a thermal profile in which each subsequent thermal stage has a progressively lower temperature than exists at a preceding thermal stage.

Cryostats generally implement support systems that utilize support rods to mechanically couple the thermal stages to the room temperature plate of the outer vacuum chamber and to maintain spatial isolation between adjacent thermal stages. Such support rods can provide a thermal conductivity path that facilitates the propagation of heat from higher temperature thermal stages to lower temperature thermal stages. Various techniques exist break that thermal conductivity path to mitigate the propagation of heat from higher temperature thermal stages to lower temperature thermal stages. For example, some techniques involve introducing holes into a support rod to break a thermal conductivity path provided by the support rod. While such techniques can facilitate mitigating the propagation of heat from higher temperature thermal stages to lower temperature thermal stages, introducing holes into a support rod can reduce a load bearing capacity of the support rod. Accordingly, such techniques may restrict scalability of cryostats.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, and/or methods that facilitate low thermal conductivity support systems within cryogenic environments are described.

According to an embodiment, a cryostat can comprise a cryostat can comprise a support rod and a washer. The support rod can couple first and second thermal stages of the cryostat. The washer can intervene between the support rod and the first thermal stage. The washer can thermally isolate the support rod and the first thermal stage. One aspect of such a cryostat is that the cryostat can facilitate low thermal conductivity support systems within cryogenic environments.

In an embodiment, a threaded internal wall of the support rod can receive a threaded shaft of an attachment mechanism via the second thermal stage to couple the support rod to the second thermal stage. In an embodiment, a polyimide sleeve can intervene between the threaded shaft of the attachment mechanism and the threaded internal wall of the support rod. One aspect of such a cryostat is that the cryostat can facilitate maintaining an integrity of a coupling between the support rod and the second thermal stage by ensuring the attachment mechanism remains centered within the threaded internal wall of the support rod.

According to another embodiment, a cryostat support system can comprise a tension support rod and a washer. The tension support rod can couple first and second thermal stages of a cryostat. The first and second thermal stages can be coupled to a top plate of an outer vacuum chamber. The washer can intervene between the tension support rod and the second thermal stage. The washer can thermally isolate the tension support rod and the second thermal stage. One aspect of such a cryostat support system is that the system can facilitate low thermal conductivity support systems within cryogenic environments.

In an embodiment, the washer can comprise a first footprint and can be received in a recess formed in the second thermal stage that reduces a thickness of the second thermal stage within a second footprint of the recess that is larger than the first footprint. One aspect of such a cryostat support system is that the system can facilitate preserving a structural integrity of the tension support rod as the geometries of second thermal stage vary due to thermal expansion/contraction.

According to another embodiment, a cryostat support system can comprise a compression support rod and a washer. The compression support rod can couple first and second thermal stages of a cryostat. The first and second thermal stages can be coupled to a bottom plate of an outer vacuum chamber. The washer can intervene between the compression support rod and the first thermal stage. The washer can thermally isolate the compression support rod and the first thermal stage. One aspect of such a cryostat support system is that the system can facilitate low thermal conductivity support systems within cryogenic environments.

In an embodiment, the compression support rod transfers at least a subset of a mechanical load incident on the second thermal stage to the bottom plate. One aspect of such a cryostat support system is that the system can facilitate managing weight/load distribution within a cryostat.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
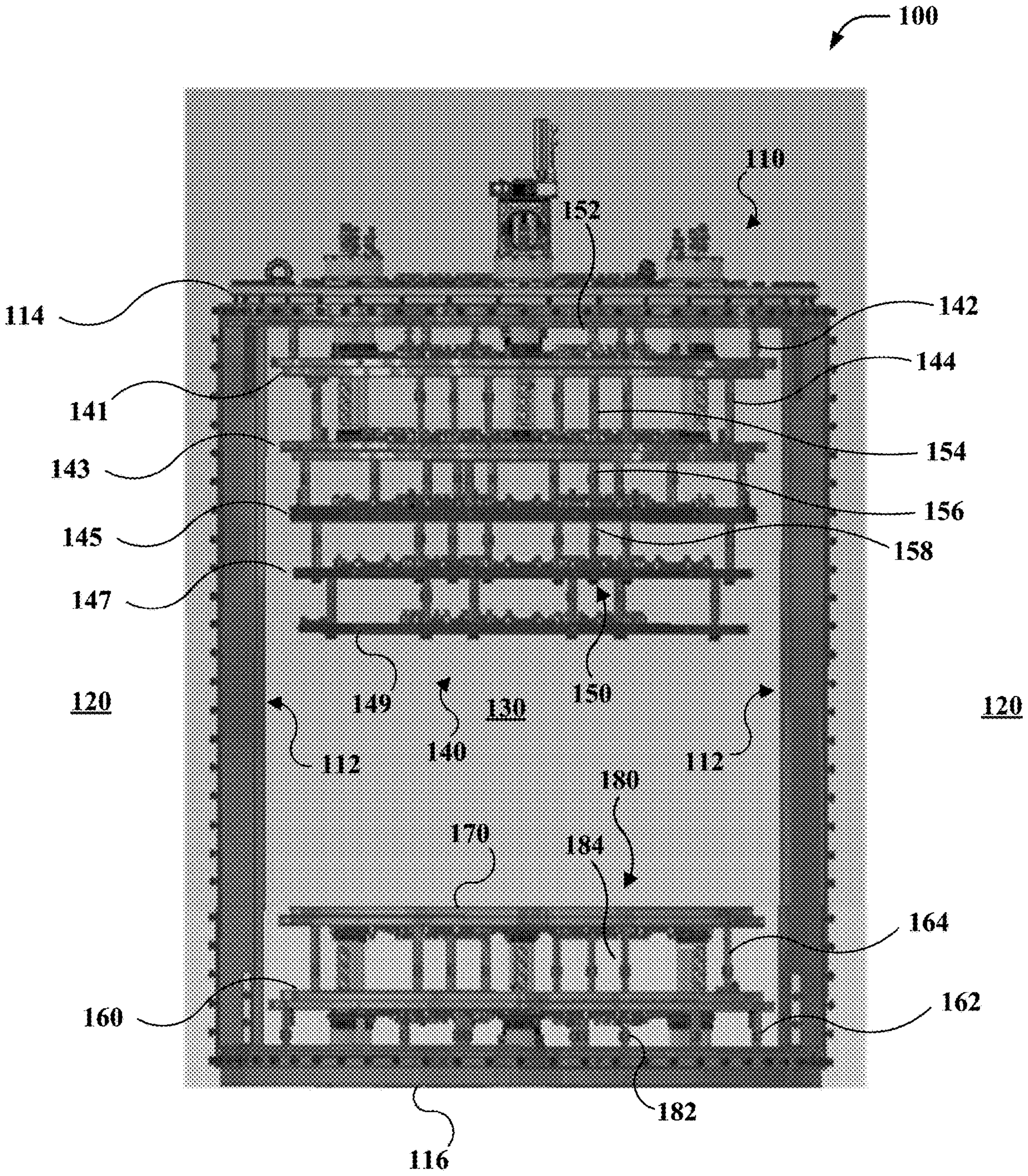
FIG. 1 illustrates an example, non-limiting cryostat, in accordance with one or more embodiments described herein.

FIG. 1 illustrates an example, non-limiting cryostat 100, in accordance with one or more embodiments described herein. As shown in FIG. 1, cryostat 100 comprises an outer vacuum chamber 110 formed by a sidewall 112 intervening between a top plate 114 and a bottom plate 116. In operation, outer vacuum chamber 110 can maintain a pressure differential between an ambient environment 120 of outer vacuum chamber 110 and an interior 130 of outer vacuum chamber 110. Cryostat 100 can further comprise a plurality of thermal stages (or stages) 140 disposed within interior 130 that are each mechanically coupled to top plate 114. The plurality of stages 140 includes: stage 141, stage 143, stage 145, stage 147, and stage 149.

Each stage among the plurality of stages 140 can be associated with a different temperature. For example, stage 141 can be a 50-kelvin (50-K) stage that is associated with a temperature of 50 kelvin (K), stage 143 can be a 4-kelvin (4-K) stage that is associated with a temperature of 4 K, stage 145 can be associated with a temperature of 700 millikelvin (mK), stage 147 can be associated with a temperature of 100 mK, and stage 149 can be associated with a temperature of 10 mK. In an embodiment, stage 145 can be a Still stage, stage 147 can be a Cold Plate stage, and stage 149 can be a Mixing Chamber stage.

One or more support rods (e.g., support rod 142) can couple the plurality of stages 140 to top plate 114 of outer vacuum chamber 110. Moreover, each stage among the plurality of stages 140 can be spatially isolated from other stages of the plurality of stages 140 by a plurality of support rods (e.g., support rod 144). Some support rods can include multiple sections. For example, support rod 150 includes sections 152, 154, 156, and 158. Section 152 of support rod 150 couples stage 141 to top plate 114 of outer vacuum chamber 110, section 154 couples stage 141 to stage 143, section 156 couples stage 143 to stage 145, and section 158 couples stage 145 to stage 147. In an embodiment, support rods 142, 144, and/or 150 can comprise stainless steel. In an embodiment, support rod 150 can transfer, at least, a subset of mechanical load incident on stages 141, 143, 145, and/or 147 to top plate 114 of outer vacuum chamber 110. For example, section 158 can transfer, at least, a subset of mechanical load incident on stage 147 to top plate 114 via sections 156, 154, and 152. By transferring, at least, a subset of mechanical load incident on stages 141, 143, 145, and/or 147 to top plate 114 of outer vacuum chamber 110, support rod 150 can facilitate managing weight/load distribution within cryostat 100. Gravity acting upon a mass of the plurality of stages 140 can induce a tension force on support rods (e.g., support rod 142) coupling the plurality of stages 140 to top plate 114 or support rods (e.g., support rods 144 and/or 150) spatially isolating those stages 140. Such support rods can be referred to as tension support rods.

As shown by FIG. 1, cryostat 100 can further comprise one or more plates coupled to bottom plate 116 of outer vacuum chamber 110. For example, cryostat 100 can further comprise a thermal plate (or plate) 160 that can facilitate mechanically supporting a thermal shield associated with stage 141. As another example, cryostat 100 can further comprise a plate 170 that can facilitate mechanically supporting a thermal shield associated with stage 143. One or more support rods (e.g., support rod 162) can couple plates 160 and/or 170 to bottom plate 116 of outer vacuum chamber 110. Moreover, plates 160 and 170 can be spatially isolated by a plurality of support rods (e.g., support rod 164).

As discussed above, some support rods can include multiple sections. For example, support rod 180 includes sections 182 and 184. Section 182 of support rod 180 couples plate 160 to bottom plate 116 of outer vacuum chamber 110 and section 184 couples plate 160 to plate 170. In an embodiment, support rods 162, 164, and/or 180 can comprise stainless steel. In an embodiment, support rod 180 can transfer, at least, a subset of mechanical load incident on plates 160 and/or 170 to bottom plate 116 of outer vacuum chamber 110. For example, section 182 can transfer, at least, a subset of mechanical load incident on plate 170 to bottom plate 116 via section 184. By transferring, at least, a subset of mechanical load incident on plates 160 and/or 170 to bottom plate 116 of outer vacuum chamber 110, support rod 180 can facilitate managing weight/load distribution within cryostat 100.

Gravity acting upon a mass of plates 160 and/or 170 can induce a compression force on support rods (e.g., support rod 162) coupling plates 160 and/or 170 to bottom plate 116 or support rods (e.g., support rods 164 and/or 180) spatially isolating those plates. Such support rods can be referred to as compression support rods.

As discussed in greater detail below, a thermal conductivity path between stages of cryostat 100 can be broken using washers comprising material having low thermal conductivity (e.g., a material having a thermal conductivity of less than 1 watt per meter-kelvin (W/mK)). In particular, a washer comprising a low thermal conductivity material (e.g., a polyimide, such as KAPTON or VESPEL that are each available from DuPont de Nemours, Inc., of Wilmington, Delaware) can intervene between a support rod and a stage to break a thermal conductivity path between stages of cryostat 100. In an embodiment, a thermal gradient along a support rod coupling three or more stages can be minimized by thermally coupling the support rod to, at least, one intervening stage within the three or more stages. For example, support rod 150 couples stages 141, 143, 145, and 147 to top plate 114 of outer vacuum chamber 110. In this example, sections 154 and/or 156 of support rod 150 can be thermally coupled to stages 143 and/or 145.

Figure 2:
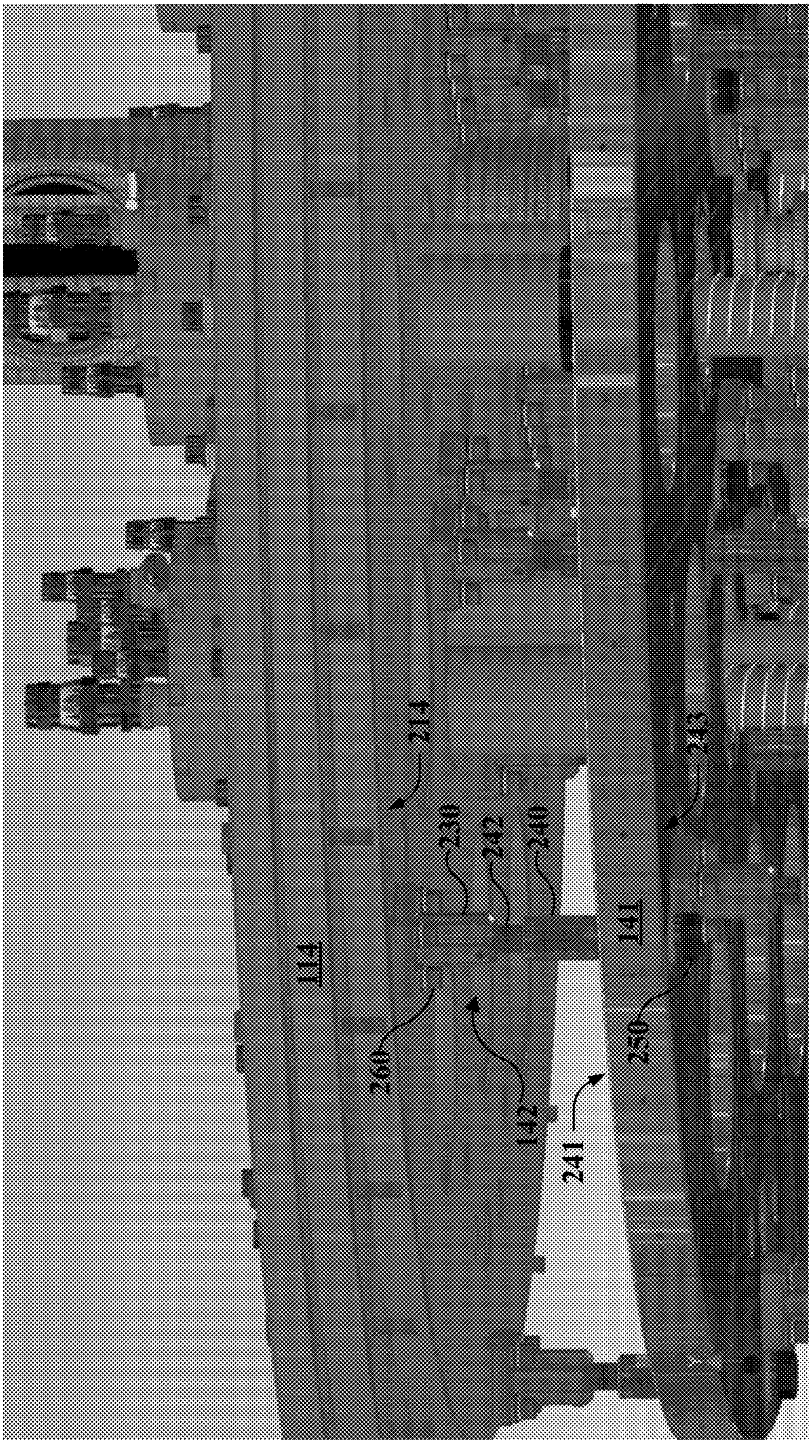
FIG. 2 illustrates an example, non-limiting close-up view depicting a support rod of the cryostat of FIG. 1, in accordance with one or more embodiments described herein.
Figure 3:
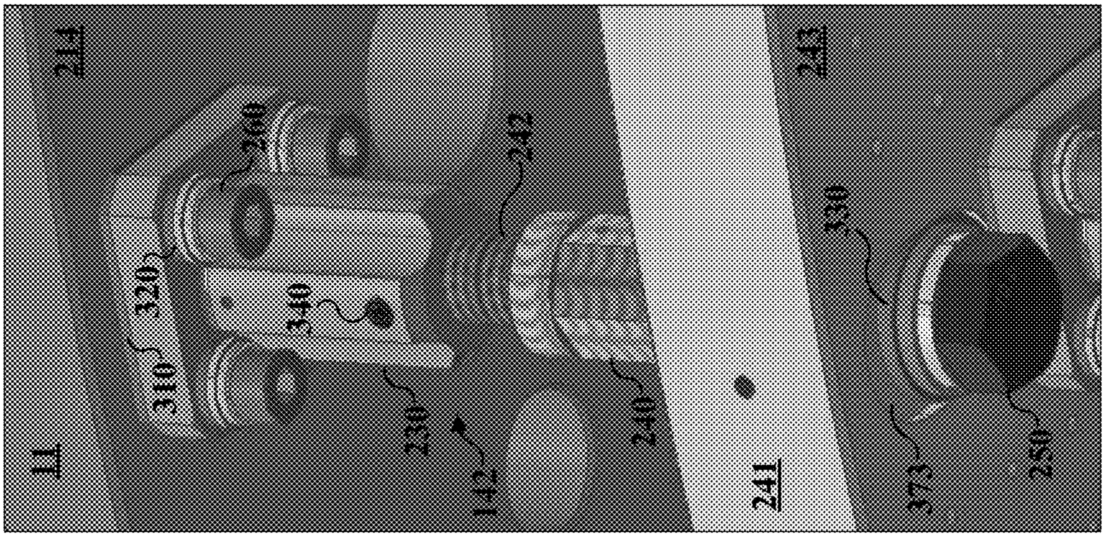
FIG. 3 illustrates another example, non-limiting close-up view depicting the support rod of FIG. 2, in accordance with one or more embodiments described herein.

FIGS. 2-5 illustrate example, non-limiting close-up views depicting support rod 142 of cryostat 100 of FIG. 1, in accordance with one or more embodiments described herein. With reference to FIGS. 2-3, support rod 142 includes multiples sections comprising a base section 230 and a shank section 240. Base section 230 is described in greater detail below with respect to FIGS. 7-9 and shank section 240 is described in greater detail below with respect to FIGS. 10-13. Top plate 114 can receive a plurality of attachment mechanisms 260 via clearance holes (e.g., clearance holes 712 of FIGS. 7-8) of base section 230 that coaxially circumscribe a longitudinal axis (e.g., longitudinal axis 810 of FIGS. 8-9) of base section 230 to couple top plate 114 and base section 230.

Figure 4:
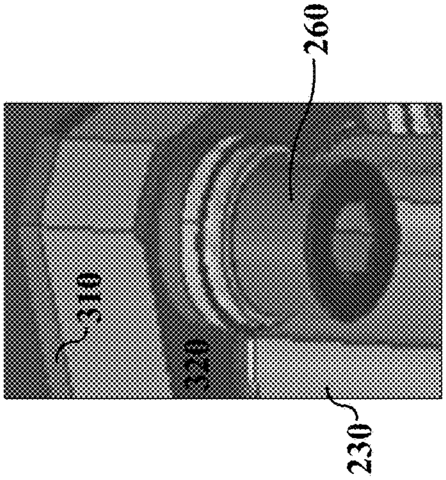
FIG. 4 illustrates an example, non-limiting close-up view depicting an attachment mechanism coupling the support rod of FIG. 2 to one thermal stage among the adjacent thermal stages, in accordance with one or more embodiments described herein.

As best seen in FIGS. 3-4, a base-stage washer 310 can intervene between an interior side 214 of top plate 114 and base section 230 to facilitate thermally isolating top plate 114 and base section 230. Base-stage washer 310 is described in greater detail below with respect to FIGS. 17-19. FIGS. 3-4 also show that a base-attachment washer 320 can intervene between each attachment mechanism 260 and base section 230 to facilitate thermally isolating top plate 114 and base section 230. Base-attachment washer 320 is described in greater detail below with respect to FIGS. 23-25.

An internal threaded wall (e.g., internal threaded wall 740 of FIGS. 7-9) of base section 230 can receive a threaded shaft 242 of shank section 240 to couple base section 230 and shank section 240. In an embodiment, an internal threaded wall of shank section 240 can receive a threaded shaft of base section 230 to couple base section 230 and shank section 240. A clearance hole (e.g., clearance hole 750 of FIG. 7) of base section 230 can receive an attachment mechanism 340 to facilitate retention of the threaded shaft 242 of shank section 240 within base section 230. In an embodiment, attachment mechanism 340 can be omitted. In an embodiment, a polyimide sleeve (not shown) can intervene between the threaded shaft of the attachment mechanism 250 and the threaded internal wall of shank section 240. The polyimide sleeve can facilitate maintaining an integrity of a coupling between support rod 142 and stage 141 by ensuring that attachment mechanism 250 remains centered within the threaded internal wall of shank section 240.

Figure 5:
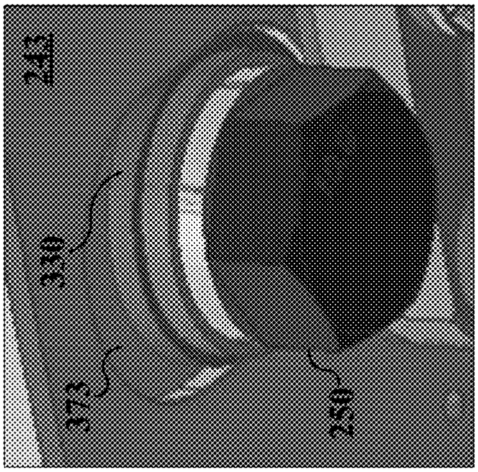
FIG. 5 illustrates an example, non-limiting close-up view depicting another attachment mechanism coupling the support rod of FIG. 2 to the other thermal stage among the adjacent thermal stages, in accordance with one or more embodiments described herein.
Figure 6:
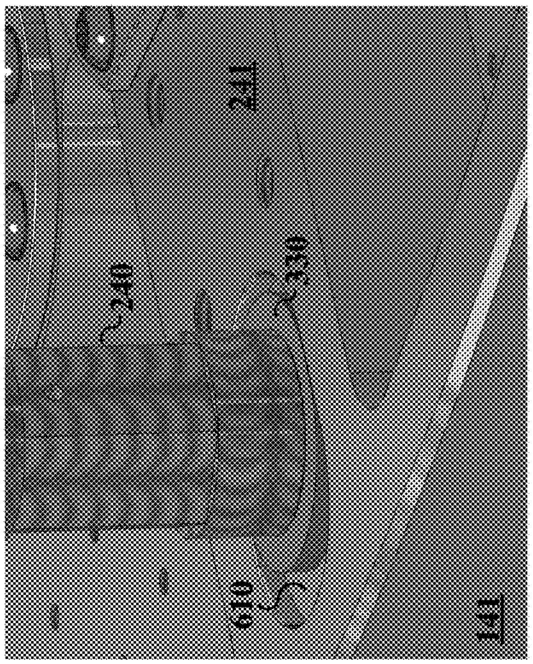
FIG. 6 illustrates an example, non-limiting close-up view depicting a washer thermally isolating the support rod of FIG. 2 from the other thermal stage, in accordance with one or more embodiments described herein.

A threaded internal wall (e.g., threaded internal wall 1012 of FIGS. 10-13) of shank section 240 can receive a threaded shaft (not shown) of an attachment mechanism 250 via stage 141 to couple shank section 240 to stage 141. As best seen in FIG. 6, a shank washer 330 can intervene between a side 241 of stage 141 that faces the interior side 214 of top plate 114 and shank section 240 to facilitate thermally isolating stage 141 and shank section 240. Shank washer 330 is described in greater detail below with respect to FIGS. 17-19. As best seen in FIGS. 3 and 5, a shank washer 330 can also intervene between a side 243 of stage 141 that opposes side 241 and attachment mechanism 250 to faciliate thermally isolating stage 141 and attachment mechanism 250. In an embodiment, positioning shank washers 330 on opposing sides of stage 141 can facilitate reducing a thermal conductivity path between the opposing sides of stage 141.

FIG. 6 shows that the shank washer 330 intervening between the side 241 of stage 141 that faces the interior side 214 of top plate 114 and shank section 240 can be received within a recess 610 formed in stage 141. Recess 610 reduces a thickness of stage 141 within a footprint of recess 610. A recess formed in a stage and a footprint of the recess are each discussed in greater detail below with respect to FIGS. 26-27. Recess 610 can comprise a footprint provided by a surface area of stage 141 comprising a reduced thickness to form recess 610. Shank washer 330 can also comprise a footprint provided by a surface area of shank washer 330 encompassed within an outer wall (e.g., outer wall 2110 of FIG. 21) of shank washer 330. FIG. 6 further show that the footprint of recess 610 can be larger than the footprint of shank washer 330 that intervenes between the side 241 of stage 141 and shank section 240.

With reference to FIGS. 3 and 5, the shank washer 330 intervening between the side 243 of stage 141 and attachment mechanism 250 can be received within a recess 373 formed in stage 141. Recess 373 reduces a thickness of stage 141 within a footprint of recess 373. Recess 373 can comprise a footprint provided by a surface area of stage 141 comprising a reduced thickness to form recess 373. Shank washer 330 can also comprise a footprint provided by a surface area of shank washer 330 encompassed within an outer wall (e.g., outer wall 2110 of FIG. 21) of shank washer 330. FIGS. 3 and 5 further show that the footprint of recess 373 can be larger than the footprint of shank washer 330 that intervenes between the side 243 of stage 141 and attachment mechanism 250.

One skilled in the art will recognize that geometries of stage 141 can vary as a temperature of stage 141 changes due to thermal expansion/contraction. Receiving each shank washer 330 within a recess of stage 141 having a larger footprint than that shank washer 330 can facilitate preserving a structural integrity of support rod 142 as the geometries of stage 141 vary due to thermal expansion/contraction. For example, the larger footprint of recess 610 can facilitate movement of support rod 142 within recess 610 responsive to such variations in geometry of stage 141 to mitigate structural failure of support rod 142. As another example, the larger footprint of recess 373 can also facilitate movement of support rod 142 within recess 610 responsive to such variations in geometry of stage 141 to mitigate structural failure of support rod 142.

Figure 7:
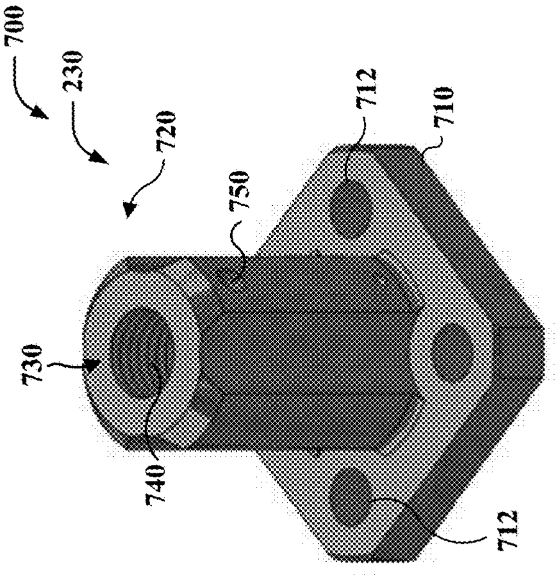
FIG. 7 illustrates an example, non-limiting isometric view depicting a base section of the support rod of FIG. 2, in accordance with one or more embodiments described herein.
Figure 9:
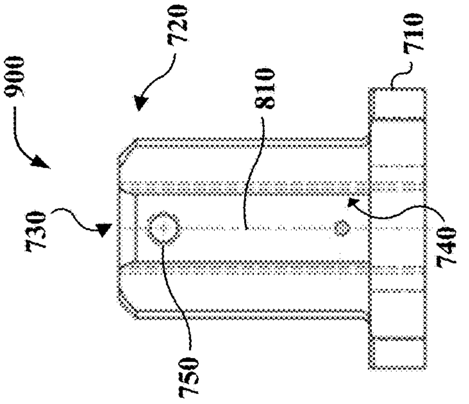
FIG. 9 illustrates an example, non-limiting side cross-sectional view of the base section of FIG. 7, in accordance with one or more embodiments described herein.
Figure 8:
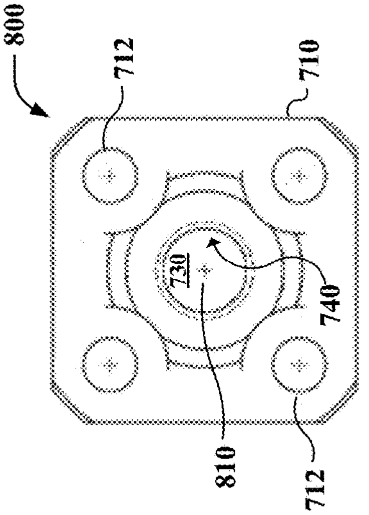
FIG. 8 illustrates an example, non-limiting orthogonal view depicting the base section of FIG. 7, in accordance with one or more embodiments described herein.

FIGS. 7-9 illustrate example, non-limiting views of base section 230, in accordance with one or more embodiments described herein. In particular, FIGS. 7-9 illustrate an isometric view 700, an orthogonal view 800, and a cross-sectional view 900 of base section 230, respectively. With reference to FIGS. 7-9, base section 230 can comprise a base plate 710 and a tapered end 720 that opposes base plate 710. Base section 230 can further comprise a channel 730 extending along a longitudinal axis 810 of base section 230. Channel 730 can be defined by a threaded internal wall 740 of base section 230. Base plate 710 comprises a plurality of clearance holes 712 coaxially circumscribing longitudinal axis 810. A plate (e.g., top plate 114 and/or bottom plate 116 of FIG. 1) of an outer vacuum chamber, a stage (e.g., stages 141-149) of a cryostat, or a plate (e.g., plates 160 and 170) of a cryostat can receive an attachment mechanism (e.g., attachment mechanisms 260 of FIGS. 2-4) via each clearance hole 712 to couple base section 230 to that plate and/or stage. Tapered end 720 can comprise a clearance hole 750 that can faciliate retention of a threaded shaft (e.g., threaded shaft 242 and/or 1420) of a shank section within base section 230.

Figure 10:
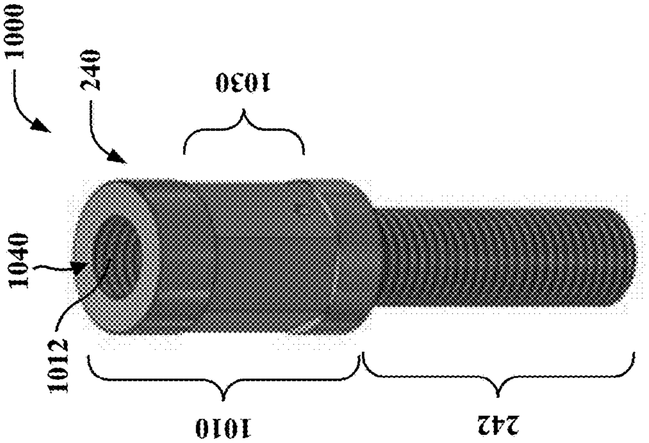
FIG. 10 illustrates an example, non-limiting isometric view depicting a shank section of the support rod of FIG. 2, in accordance with one or more embodiments described herein.
Figure 11:
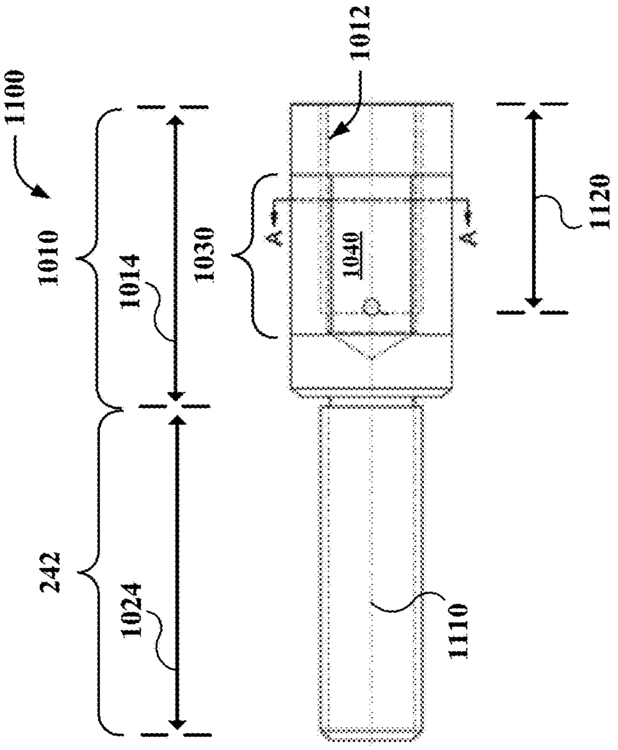
FIG. 11 illustrates an example, non-limiting side cross-sectional view of the shank section of FIG. 10, in accordance with one or more embodiments described herein.
Figure 12:
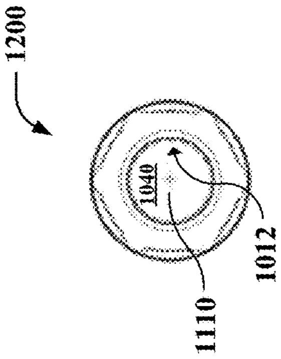
FIG. 12 illustrates an example, non-limiting orthogonal view depicting the shank section of FIG. 10, in accordance with one or more embodiments described herein.
Figure 13:
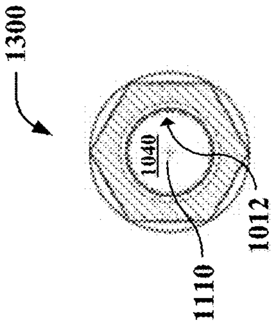
FIG. 13 illustrates an example, non-limiting cross-sectional view of the shank section of FIG. 10 taken along line A-A of FIG. 12, in accordance with one or more embodiments described herein.

FIGS. 10-13 illustrate example, non-limiting views of shank section 240, in accordance with one or more embodiments described herein. In particular, FIGS. 10-12 illustrate an isometric view 1000, a cross-sectional view 1100, and an orthogonal view 1200 of shank section 240, respectively. FIG. 13 illustrates a cross-sectional view 1300 of shank section 240 taken along line A-A of FIG. 12. With reference to FIGS. 10-13, shank section 240 can comprise a body 1010 and a threaded shaft 242 disposed along a centerline 1110 of shank section 240. Body 1010 can comprise a channel 1040 extending along the centerline 1110 of shank section 240. Channel 1040 can be defined by a threaded internal wall 1012 of shank section 240. The threaded internal wall 1012 of shank section 240 can receive a threaded shaft of an attachment mechanism (e.g., attachment mechanism 250) via a plate (e.g., top plate 114 and/or bottom plate 116 of FIG. 1) of an outer vacuum chamber, a stage (e.g., stages 141-149) of a cryostat, or a plate (e.g., plates 160 and 170) of a cryostat to couple shank section 240 to that plate and/or stage. An internal threaded wall (e.g., internal threaded wall 740) of a base section can receive the threaded shaft 242 of shank section 240 to couple shank section 240 to the base section. Body 1010 can further comprise a tool interface 1030 to facilitate installation and/or removal of shank section 240.

Figure 15:
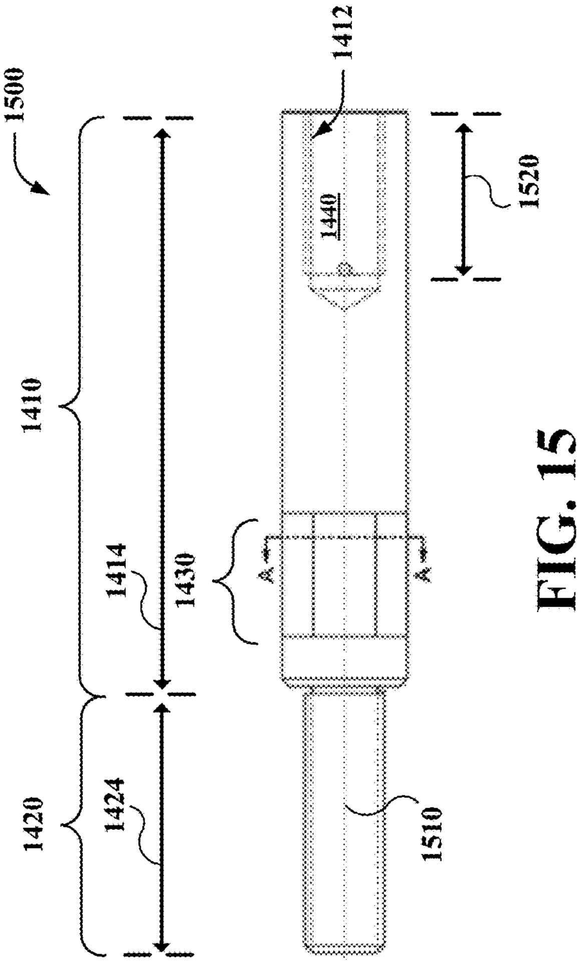
FIG. 15 illustrates an example, non-limiting side cross-sectional view of the shank section of FIG. 14, in accordance with one or more embodiments described herein.
Figure 16:
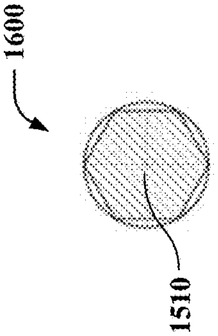
FIG. 16 illustrates an example, non-limiting cross-sectional view of the shank section of FIG. 14 taken along line A-A of FIG. 15, in accordance with one or more embodiments described herein.
Figure 14:
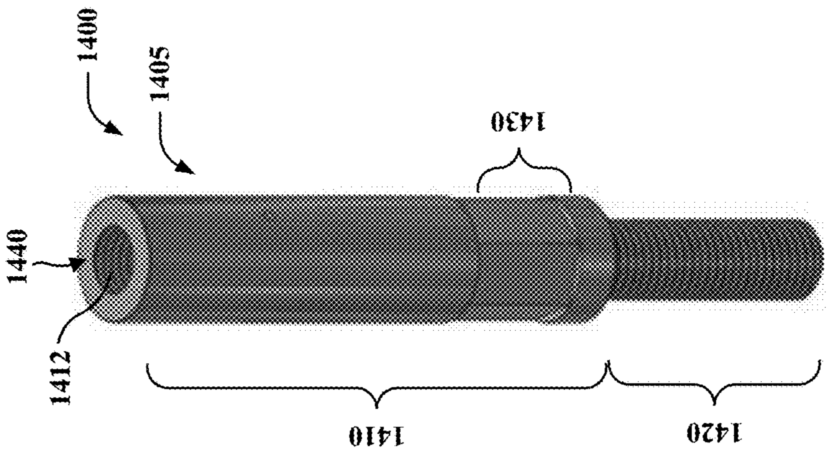
FIG. 14 illustrates an example, non-limiting isometric view depicting another shank section, in accordance with one or more embodiments described herein.

FIGS. 14-16 illustrate example, non-limiting views of a shank section 1405, in accordance with one or more embodiments described herein. In particular, FIGS. 14-15 illustrate an isometric view 1400 and a side cross-sectional view 1500 of shank section 1405, respectively. FIG. 16 illustrates a cross-sectional view 1600 of shank section 1405 taken along line A-A of FIG. 15. With reference to FIGS. 14-16, shank section 1405 can comprise a body 1410 and a threaded shaft 1420 disposed along a centerline 1510 of shank section 1405. Body 1410 can comprise a channel 1440 extending along the centerline 1510 of shank section 1405. Channel 1440 can be defined by a threaded internal wall 1412 of shank section 1405. The threaded internal wall 1412 of shank section 1405 can receive a threaded shaft of an attachment mechanism (e.g., attachment mechanism 250) via a plate (e.g., top plate 114 and/or bottom plate 116 of FIG. 1) of an outer vacuum chamber, a stage (e.g., stages 141-149) of a cryostat, or a plate (e.g., plates 160 and 170) of a cryostat to couple shank section 1405 to that plate and/or stage. An internal threaded wall (e.g., internal threaded wall 740) of a base section can receive the threaded shaft 1420 of shank section 1405 to couple shank section 1405 to the base section. Body 1410 can further comprise a tool interface 1430 to facilitate installation and/or removal of shank section 1405.

A comparison between shank sections 240 and 1405 illustrates that a number of variations can be made to a shank section to accommodate different cryostat configurations (e.g., spacing between adjacent stages). For example, shank section 240 comprises a length (defined by a length 1014 of body 1010 and a length 1024 of threaded shaft 242) that is less than a length (defined by a length 1414 of body 1410 and a length 1424 of threaded shaft 1420) of shank section 1405. In this example, shank section 240 can facilitate coupling adjacent stages and/or plates of a cryostat that are relatively closely spaced whereas shank section 1405 can facilitate coupling adjacent stages and/or plates of the cryostat that are relatively distantly spaced. As another example, shank section 1405 comprises a ratio between the length 1414 of body 1410 and the length 1424 of threaded shaft 1420 that is larger than a comparable ratio of shank section 240. This distinction illustrates that a ratio between a length of a body and a length of a threaded shaft can be varied for a shank section to accommodate different load bearing requirements.

As another example, channel 1040 extends within the body 1010 of shank section 240 by a length 1120 that positions channel 1040 within tool interface 1030. In contrast, channel 1440 extends within the body 1410 of shank section 1405 by a length 1520 that positions channel 1440 external to tool interface 1430. A comparison between FIGS. 13 and 16 shows that tool interface 1430 of shank section 1405 remains solid whereas some material comprising body 1010 of shank section 240 has been removed within tool interface 1030. As such, a greater amount of torque can be applied to tool interface 1430 of shank section 1405 than can be applied to tool interface 1030 of shank section 240. This distinction illustrates that a length of a channel within a shank section can be varied to accommodate different torque requirements.

Figure 17:
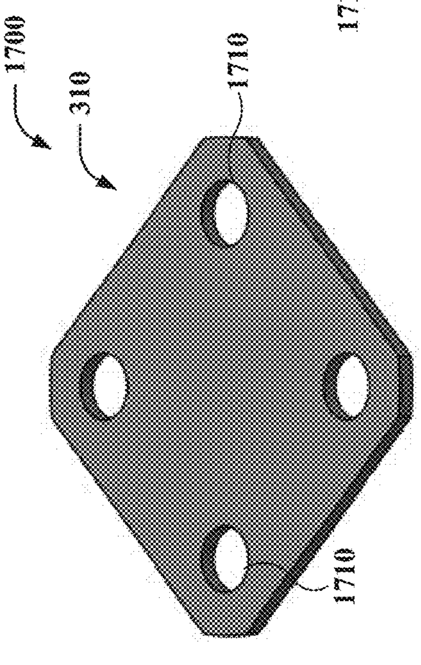
FIG. 17 illustrates an example, non-limiting isometric view depicting a base-stage washer, in accordance with one or more embodiments described herein.
Figure 18:
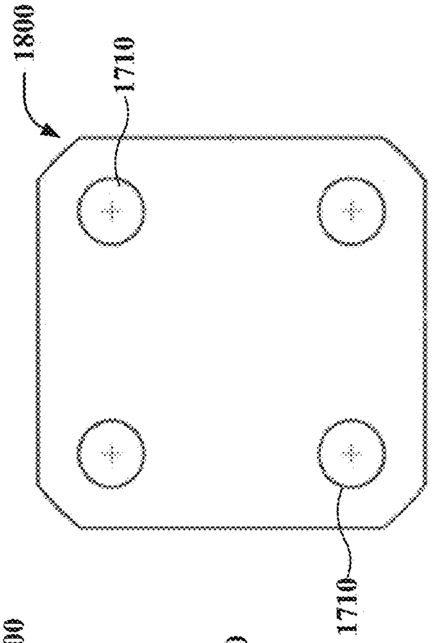
FIG. 18 illustrates an example, non-limiting orthogonal view depicting the base-stage washer of FIG. 17, in accordance with one or more embodiments described herein.
Figure 19:
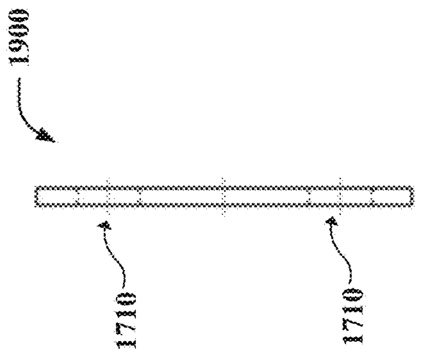
FIG. 19 illustrates an example, non-limiting side view of the base-stage washer of FIG. 17, in accordance with one or more embodiments described herein.

FIGS. 17-19 illustrate example, non-limiting views of base-stage washer 310, in accordance with one or more embodiments described herein. In particular, FIGS. 17-19 illustrate an isometric view 1700, an orthogonal view 1800, and a side view 1900 of base-stage washer 310, respectively. With reference to FIGS. 17-19, base-stage washer 310 can comprise a plurality of openings 1710 that each align with a respective clearance hole (e.g., clearance holes 710) of a base plate. In an embodiment, base-stage washer 310 can comprise material having low thermal conductivity (e.g., a material having a thermal conductivity of less than 1 watt per meter-kelvin (W/mK)). In an embodiment, base-stage washer 310 can comprise polyimide (e.g., KAPTON or VESPEL).

Figure 20:
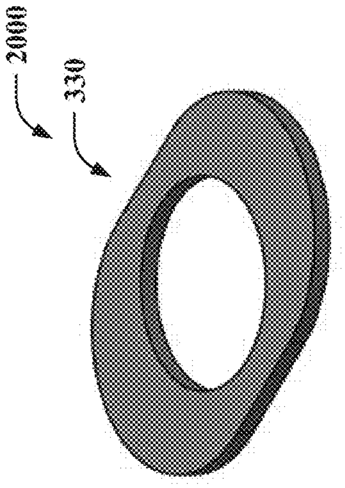
FIG. 20 illustrates an example, non-limiting isometric view depicting a shank washer, in accordance with one or more embodiments described herein.
Figure 21:
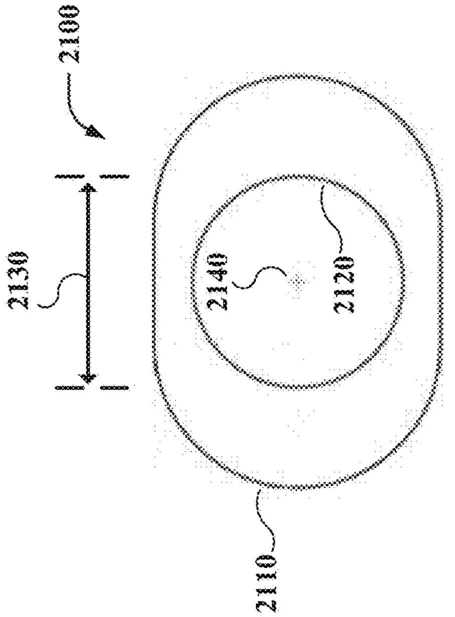
FIG. 21 illustrates an example, non-limiting orthogonal view depicting the shank washer of FIG. 20, in accordance with one or more embodiments described herein.
Figure 22:
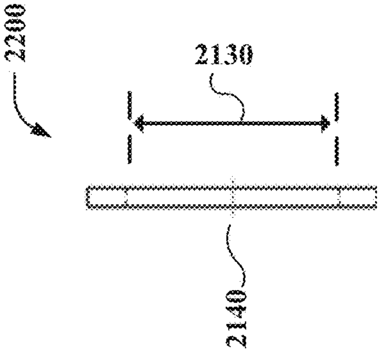
FIG. 22 illustrates an example, non-limiting side view of the shank washer of FIG. 20, in accordance with one or more embodiments described herein.

FIGS. 20-22 illustrate example, non-limiting views of shank washer 330, in accordance with one or more embodiments described herein. In particular, FIGS. 20-22 illustrate an isometric view 2000, an orthogonal view 2100, and a side view 2200 of shank washer 330, respectively. With reference to FIGS. 20-22, shank washer 330 can comprise an outer wall 2110 and an inner wall 2120 that each circumscribe a centerline 2140 of shank washer 330. The outer wall 2110 can encompass a surface area that provides a footprint of shank washer 330. The inner wall 2120 can define an opening with a diameter 2130 that can receive threaded shaft of an attachment mechanism (e.g., attachment mechanism 250) that facilitates coupling a shank section of a support rod to a stage and/or plate of a cryostat. In an embodiment, shank washer 330 can comprise material having low thermal conductivity (e.g., a material having a thermal conductivity of less than 1 watt per meter-kelvin (W/mK)). In an embodiment, shank washer 330 can comprise polyimide (e.g., KAPTON or VESPEL).

Figure 23:
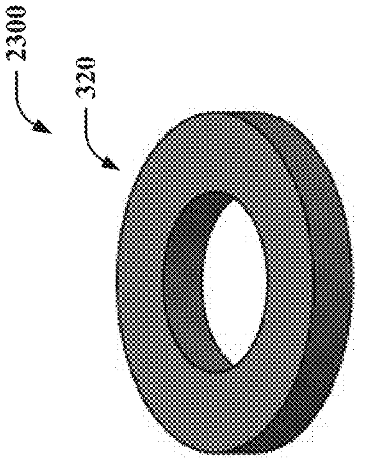
FIG. 23 illustrates an example, non-limiting isometric view depicting a base-attachment washer, in accordance with one or more embodiments described herein.
Figure 24:
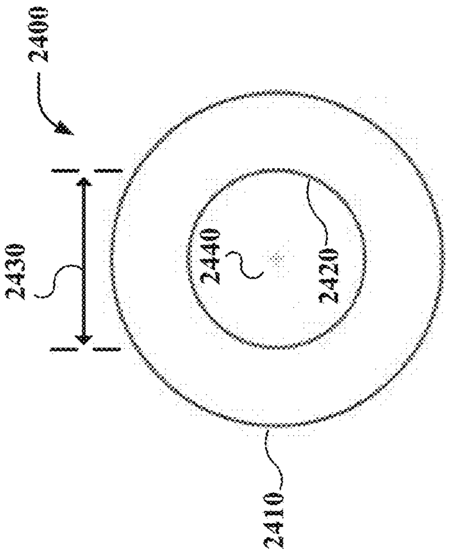
FIG. 24 illustrates an example, non-limiting orthogonal view depicting the base-attachment washer of FIG. 23, in accordance with one or more embodiments described herein.
Figure 25:
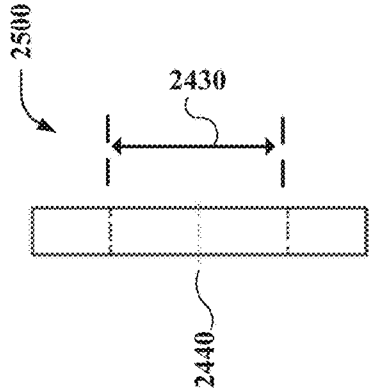
FIG. 25 illustrates an example, non-limiting side view of the base-attachment washer of FIG. 23, in accordance with one or more embodiments described herein.

FIGS. 23-25 illustrate example, non-limiting views of base-attachment washer 320, in accordance with one or more embodiments described herein. In particular, FIGS. 23-25 illustrate an isometric view 2300, an orthogonal view 2400, and a side view 2500 of base-attachment washer 320, respectively. With reference to FIGS. 23-25, base-attachment washer 320 can comprise an outer wall 2410 and an inner wall 2420 that each circumscribe a centerline 2440 of base-attachment washer 320. The outer wall 2410 can encompass a surface area that provides a footprint of base-attachment washer 320. The inner wall 2420 can define an opening with a diameter 2430 that can receive threaded shaft of an attachment mechanism (e.g., attachment mechanism 260) that facilitates coupling a base section of a support rod to a stage and/or plate of a cryostat. In an embodiment, base-attachment washer 320 can comprise material having low thermal conductivity (e.g., a material having a thermal conductivity of less than 1 watt per meter-kelvin (W/mK)). In an embodiment, base-attachment washer 320 can comprise polyimide (e.g., KAPTON or VESPEL).

Figure 26:
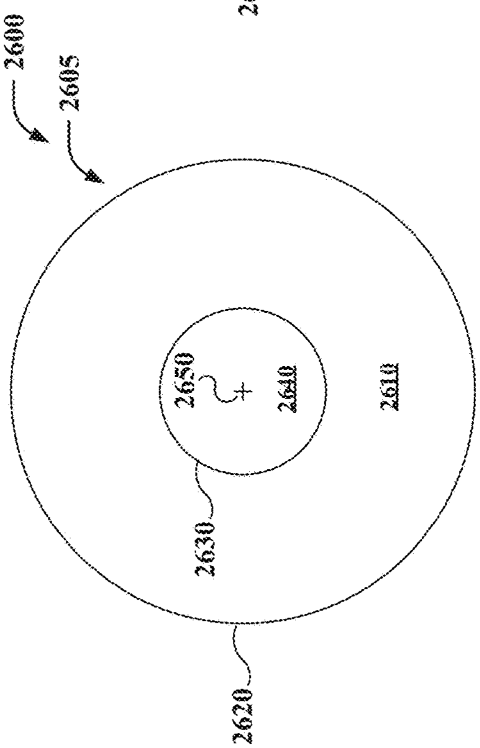
FIG. 26 illustrates an example, non-limiting orthogonal view of a recess formed in a thermal stage of a cryostat, in accordance with one or more embodiments described herein.
Figure 27:
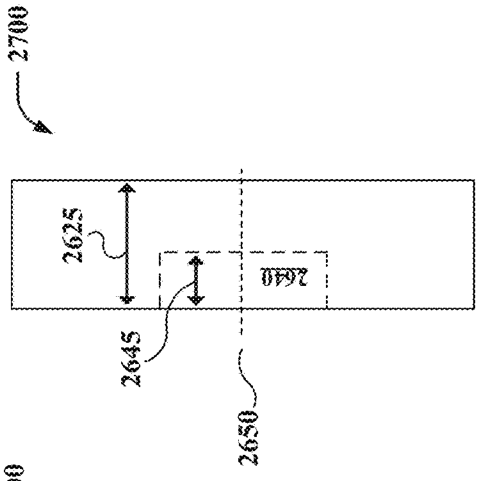
FIG. 27 illustrates an example, non-limiting side view of the recess of FIG. 26, in accordance with one or more embodiments described herein.

FIGS. 26-27 illustrate example, non-limiting views of a recess 2640 formed in a stage 2605 (or plate) of a cryostat, in accordance with one or more embodiments described herein. In particular, FIGS. 26-27 illustrate an isometric view 2600 and a side view 2700 of the recess 2640 formed in the stage 2605, respectively. With reference to FIGS. 26-27, stage 2605 can comprise an outer wall 2620 that circumscribes a centerline 2650 of stage 2605. As shown by FIGS. 26-27, a recess 2640 can be formed in stage 2605 that reduces a thickness of stage 2605 within a footprint 2630 of the recess 2640. For example, stage 2605 can comprise a thickness 2625 in a surface area 2610 external to recess 2640 that is greater than a thickness 2645 of stage 2605 within recess 2640.

Embodiments of the present invention may be a system, a method, and/or an apparatus at any possible technical detail level of integration. What has been described above includes mere examples of systems, methods, and apparatus. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed is:

1. A cryostat, comprising:

a support rod coupling first and second thermal stages of the cryostat; and a washer intervening between the support rod and the first thermal stage, the washer thermally isolating the support rod and the first thermal stage, wherein the washer is received in a recess formed in the first thermal stage that reduces a thickness of the first thermal stage within a footprint of the recess.

2. The cryostat of claim 1, wherein the washer is formed of a material having a thermal conductivity of less than 1 watt per meter times kelvin.

3. The cryostat of claim 1, wherein the washer comprises polyimide.

4. The cryostat of claim 1, wherein the support rod comprises a base plate coupled to the first thermal stage via the washer and a tapered end that opposes the base plate.

5. The cryostat of claim 4, wherein the support rod comprises a channel extending along a longitudinal axis of the support rod from the base plate to the tapered end, and wherein the channel is defined by a threaded internal wall of the support rod.

6. The cryostat of claim 4, wherein the base plate comprises a plurality of clearance holes coaxially circumscribing a longitudinal axis of the support rod.

7. The cryostat of claim 1, wherein a third thermal stage intervenes between the first and second thermal stage.

8. The cryostat of claim 7, wherein the support rod is thermally isolated from the second thermal stage and is thermally coupled to the third thermal stage.

9. The cryostat of claim 1, further comprising:

an additional washer intervening between the support rod and the second thermal stage, the additional washer thermally isolating the support rod and the second thermal stage.

10. The cryostat of claim 1, wherein the support rod includes multiple sections comprising a first section coupled to the first thermal stage and a second section coupled to the second thermal stage, and wherein a threaded internal wall of the first section receives a threaded shaft of the second section to couple the first and second sections.

11. The cryostat of claim 1, wherein a threaded internal wall of the support rod receives a threaded shaft of an attachment mechanism via the second thermal stage to couple the support rod to the second thermal stage.

12. The cryostat of claim 11, wherein a polyimide sleeve intervenes between the threaded shaft of the attachment mechanism and the threaded internal wall of the support rod.

13. The cryostat of claim 11, wherein washers positioned on opposing sides of the second thermal stage reduce a thermal conductivity path between the opposing sides of the second thermal stage.

14. The cryostat of claim 1, wherein the support rod comprises stainless steel.

15. A cryostat support system, comprising:

a tension support rod coupling first and second thermal stages of a cryostat coupled to a top plate of an outer vacuum chamber; and a washer intervening between the tension support rod and the second thermal stage, the washer thermally isolating the tension support rod and the second thermal stage, wherein the washer comprises a first footprint and is received in a recess formed in the second thermal stage that reduces a thickness of the second thermal stage within a second footprint of the recess that is larger than the first footprint.

16. The cryostat support system of claim 15, wherein the tension support rod transfers at least a subset of a mechanical load incident on the second thermal stage to the top plate.

17. The cryostat support system of claim 15, further comprising:

an additional washer intervening between the tension support rod and the first thermal stage to thermally isolate the tension support rod and the first thermal stage.

18. The cryostat support system of claim 15, wherein the tension support rod includes a base plate comprising a plurality of clearance holes coaxially circumscribing a longitudinal axis of the tension support rod, and wherein an additional washer includes a plurality of openings that each align with a respective clearance hole of the base plate.

19. The cryostat support system of claim 15, wherein the tension support rod includes multiple sections comprising a first section coupled to the first thermal stage and a second section coupled to the second thermal stage, and wherein a threaded internal wall of the first section receives a threaded shaft of the second section to couple the first and second sections.

20. The cryostat support system of claim 15, wherein the tension support rod includes multiple sections comprising a first section coupled to the second thermal stage and a second section coupled to the first thermal stage, and wherein a threaded internal wall of the first section receives a threaded shaft of the second section to couple the first and second sections.

21. A cryostat, comprising:

a support rod coupling first and second thermal stages of the cryostat; and a washer intervening between the support rod and the first thermal stage, the washer thermally isolating the support rod and the first thermal stage, wherein the support rod comprises a base plate coupled to the first thermal stage via the washer and a tapered end that opposes the base plate.

22. The cryostat of claim 21, wherein the washer is formed of a material having a thermal conductivity of less than 1 watt per meter times kelvin.

23. The cryostat of claim 21, wherein the washer comprises polyimide.

24. The cryostat of claim 21, wherein the support rod comprises a channel extending along a longitudinal axis of the support rod from the base plate to the tapered end, and wherein the channel is defined by a threaded internal wall of the support rod.

25. The cryostat of claim 21, wherein the base plate comprises a plurality of clearance holes coaxially circumscribing a longitudinal axis of the support rod.

26. A cryostat, comprising:

a support rod coupling first and second thermal stages of the cryostat; and a washer intervening between the support rod and the first thermal stage, the washer thermally isolating the support rod and the first thermal stage, wherein a third thermal stage intervenes between the first and second thermal stage, and wherein the support rod is thermally isolated from the second thermal stage and is thermally coupled to the third thermal stage.

* * * * *